United States Patent [19]
Wright

[11] Patent Number: 5,038,942
[45] Date of Patent: Aug. 13, 1991

[54] MULTI-UNIT STORAGE CARRIERS FOR DISC-SHAPED CONTAINERS

[76] Inventor: John Wright, Pilgrim Cottage, Bedham, Fittleworth, Pulborough, West Sussex, RH20 1JP, England

[21] Appl. No.: 573,454

[22] Filed: Aug. 27, 1990

[30] Foreign Application Priority Data

Aug. 29, 1989 [GB] United Kingdom .............. 8919509

[51] Int. Cl.$^5$ ............................................ A47B 63/00
[52] U.S. Cl. ....................................... 211/40; 211/194
[58] Field of Search ............... 211/40, 194; 312/107, 312/108, 9; 206/387

[56] References Cited

U.S. PATENT DOCUMENTS

| | | | |
|---|---|---|---|
| 2,405,416 | 8/1946 | Foulkes | 312/107 |
| 3,439,811 | 4/1969 | Bell | 211/135 X |
| 3,741,403 | 6/1973 | Fleischer, Jr. et al. | 211/126 X |
| 4,450,970 | 5/1984 | Shepherd | 211/189 |

Primary Examiner—Alvin C. Chin-Shue
Assistant Examiner—Sarah A. Lechok
Attorney, Agent, or Firm—Ostrolenk, Faber, Gerb & Soffen

[57] ABSTRACT

A multi-unit storage rack for cassettes and other containers of recorded information which is formed from a plurality of vertical castellated walls defining a stack of slots for the cassettes, and enabling adjacent similar racks to nest together to increase its size.

6 Claims, 2 Drawing Sheets

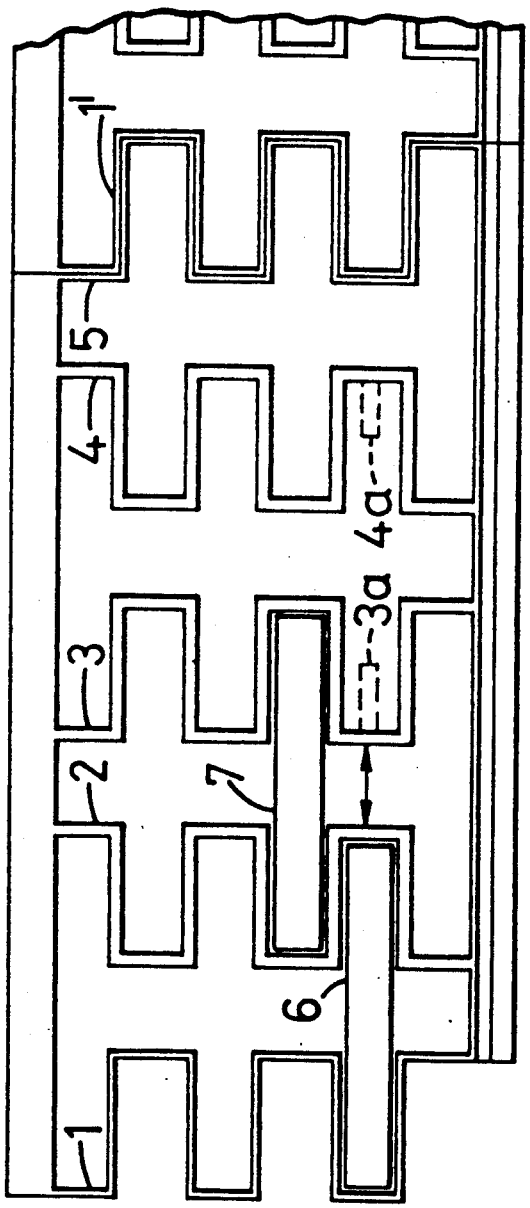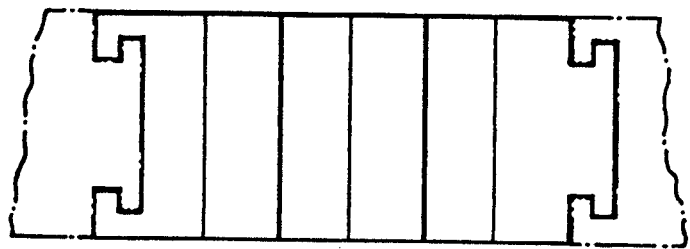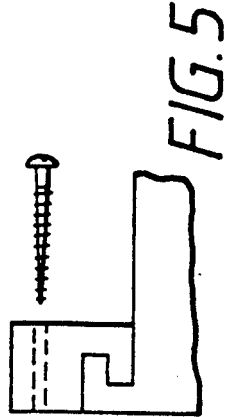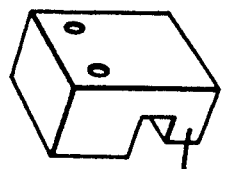

MULTI-UNIT STORAGE CARRIERS FOR DISC-SHAPED CONTAINERS

The present invention relates to multi-unit storage carriers for disc-shaped containers such as cassettes, or containers of discs of recorded information. It is often desirable to be able to store cassettes, or disc containers, e.g audio or video tape cassettes, CD containers, digital tape containers, computer floppy discs in their sleeves, in a manner which is neat, which protects the container and which allows for ready access to any individual container.

Moreover, as a collection of such containers grows, it is desirable for the storage facility to be increased in a convenient way.

Accordingly, the present invention provides a multi-unit storage rack for disc-shaped containers of recorded information comprising a plurality of adjacent castellated vertical walls of alternating opposed symmetry, which define between adjacent walls, a plurality of interleaved vertical stacks of slots to accommodate a corresponding plurality of disc-shaped containers.

Preferably the outer castellated vertical walls are half the wall thickness of the inner castellated vertical walls to enable similar storage racks to nest with said rack in order to increase its size.

With this arrangement a basic unit might consist of five castellated walls defining for example four staggered interleaved stacks of containers. Each basic unit may be two, three or more containers high (per stack), but conveniently will in a basic unit be three containers high. The present invention in its preferred form enables basic units consisting of the castellated walls to be slotted together to build up into a larger unit. Thus for example a basic unit four containers wide can readily be converted into a larger unit eight containers wide.

As well as enabling units to be built up by being attached adjacent one another, it is also possible to build up a stack in the vertical direction. For this purpose, upper and lower horizontal faces of a basic unit are provided with matching tongued and grooved fitments. Then, any number of units can be slotted together via the tongued and grooved fitments in a vertical sense to enable the height of the carrier to be built up as required. The tongued and grooved arrangement can also be used for securing the carrier to a surface such as a wall.

In regard to the provision of staggered interleaved stacks, it is preferable that the degree of interleaving should leave a gap in the horizontal sense between adjacent container slots. This then provides space for fingers to grip the container of the next higher layer.

An embodiment of the invention will now be described by way of example with reference to the accompanying diagrammatic drawings in which:

FIG. 1 is a front elevation showing a basic unit and a second unit (part cut away) slottingly attached thereto;

FIG. 3 shows a side elevation of three units vertically stacked together; and

FIGS. 4 and 5 show arrangements for attaching a unit to a wall.

Figure 2:
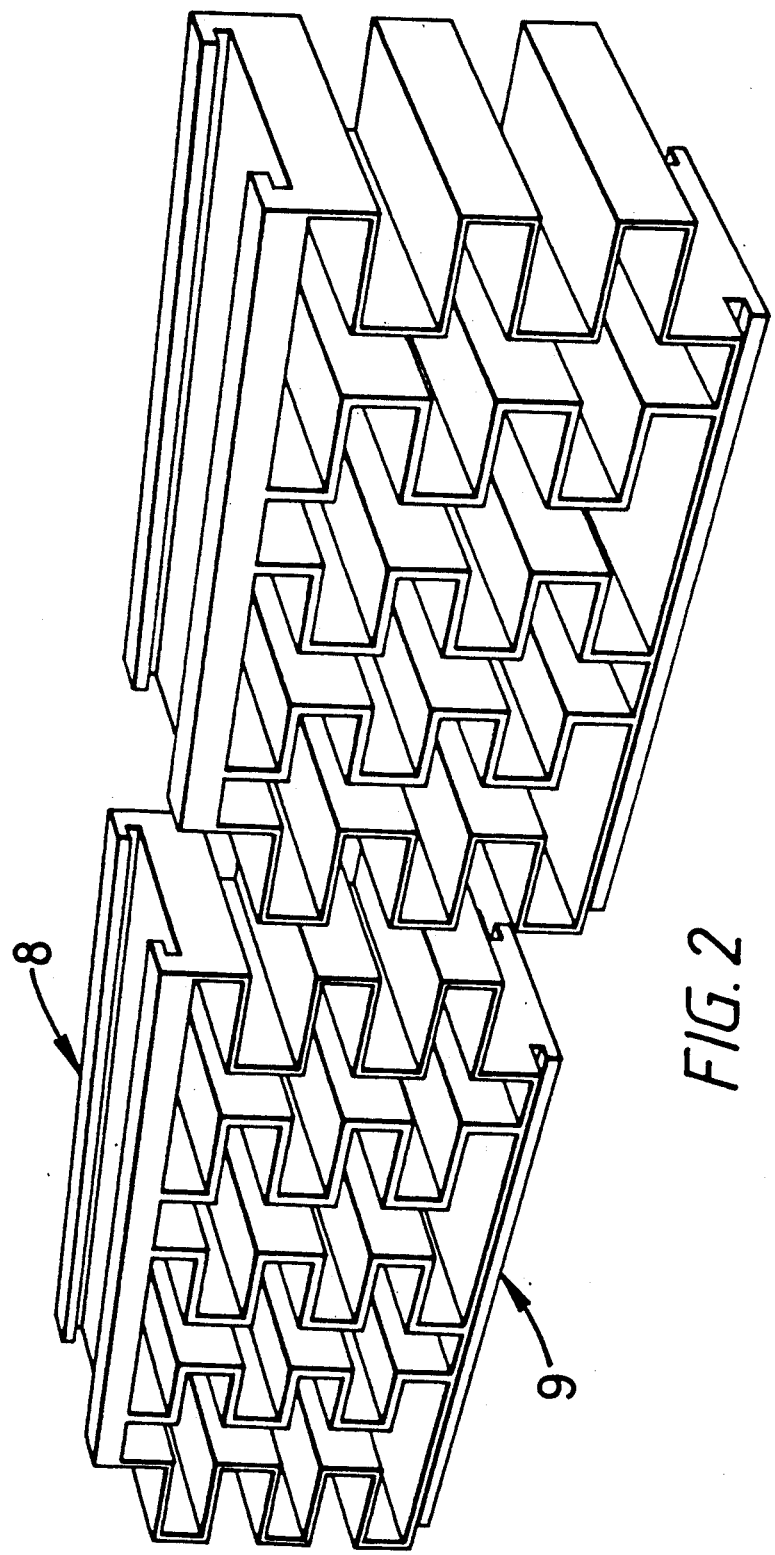
FIG. 2 shows a perspective view of two units about to be slotted together.

Referring to FIG. 1, a basic unit comprises five vertical castellated walls 1, 2, 3, 4, 5 which define staggered interleaving stacks of slots to accept cassettes, for example 6, 7 shown in FIG. 1. In the example shown in FIG. 1 the one basic unit formed from five castellated walls will provide four staggered interleaved vertical stacks of cassettes, in the example shown three cassettes high per stack (and six overall).

The unit may be dimensioned to accept audio cassettes in each slot. However it is a straightforward matter to have dimensions to accommodate a video cassette, or a CD container. In the case of computer floppy discs in their sleeves, these are relatively thinner and therefore each slot may accommodate more than one such floppy disc, and these may if desired be spaced by spacing tongues 3a, 3b (shown dotted).

An important feature of the invention is that one unit can be slottingly attached to an adjacent unit. The castellated walls at each side edge of the unit, 1, 5, are each of half the thickness of the castellated walls interior to these side edges, i.e the castellated walls 2, 3 and 4. This means that when the castellated wall 5 is nested into the adjacent wall 1' of the next unit, the total thickness of the two walls together come to the same thickness as the thickness as the interior walls 2, 3 and 4. Thus, all the clearances to enable cassettes such as 6 and 7, to be a functional sliding fit in the slots are so provided.

It should also be noted that the amount of interleaving between each stack is such as to leave a slight gap (see double ended arrow) at the centre of each cassette. This therefore provides sufficient space for the cassette to be gripped by the fingers for removal from a slot.

FIG. 2 shows in perspective two basic units adjacent one another about to be slotted together in this way.

At the upper and lower edges of each of the castellated walls 1, 2, 3. 4, 5, are tongued and grooved horizontal faces 8 and 9.

Referring to FIG. 3, which shows an end elevation of a number of stacked units, it can be seen that the tongued and grooved faces 8 and 9 enable any number of units to be built up vertically. Thus, starting with a single base unit, this can be built up both horizontally and vertically into any larger size as may be required.

FIGS. 4 and 5 show a wall fitment with a mating attachment 10 for connection to a tongued or grooved face of a basic unit. This fitment has symmetry so as to be capable of being fitted either to a tongue or to a groove.

I claim:

1. A multi-unit storage rack for articles, the rack comprising:

the rack having opposite vertical ends; a plurality of spaced apart vertical walls, including a respective outer wall on each of the opposite vertical ends and at least one inner wall between the outer walls;

each wall being castellated in shape, with the one vertical wall being of opposed symmetry to the adjacent vertical wall, and the walls being so castellated in shape and so placed as to define between adjacent vertical walls a stack of a plurality of slots for receiving articles;

the inner and the outer walls having respective thicknesses, with the outer walls having half the wall thickness of the inner walls, the half thickness of the outer walls being for enabling the respective adjacent outer wall of another one of the storage racks to have its half thickness outer wall nest with the half thickness outer wall of the first of the racks.

2. The multi-unit storage rack of claim 1, wherein there are a plurality of the inner walls.

3. The multi-unit storage rack of claim 2, wherein all of the outer and inner walls are castellated to define uniform size slots for the articles.

4. The multi-unit storage rack of claim 3, wherein the vertical walls of the rack are castellated, so that adjacent walls define cooperating slots shaped for receiving and holding a respective disc shaped container therein.

5. The multi-unit storage rack of claim 4, wherein the slots on the outer wall and the adjacent inner wall are so placed that a respective article receiving slot on one of those walls is opposite one of the article receiving slots on the adjacent wall, and both of these slots are identical in height.

6. The multi-unit storage rack of claim 5 wherein the walls are castellated for defining slots in the vertical direction which alternate with one slot facing in one direction and the next slot facing in the opposite direction, and the slots along each wall are interleaved along the wall.

* * * * *